Figure 1:
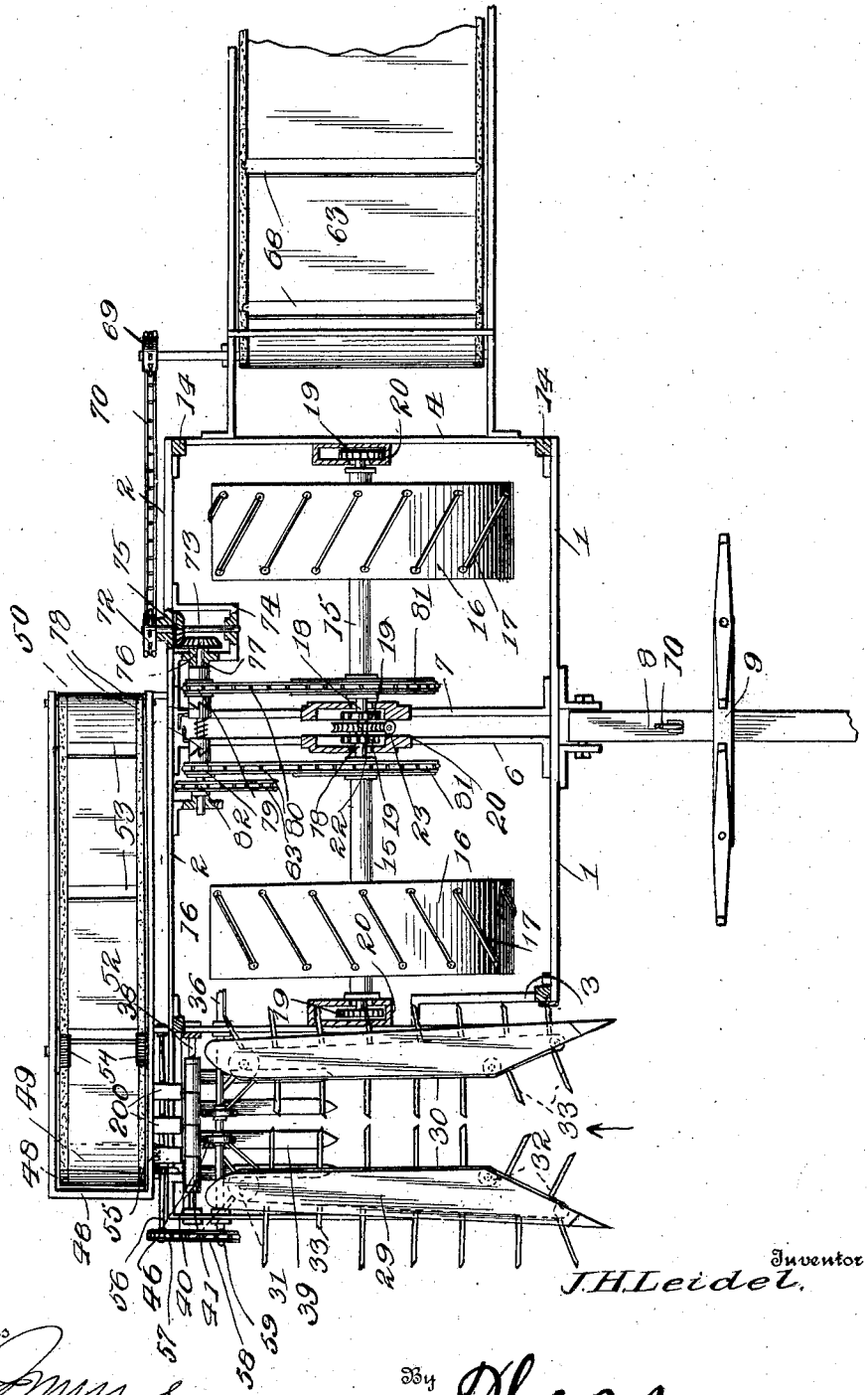

No. 845,958. PATENTED MAR. 5, 1907.
J. H. LEIDEL.
CORN PICKER.
APPLICATION FILED FEB. 17, 1906.

5 SHEETS—SHEET 1.

Inventor
J. H. Leidel,

Witnesses

By R. H. A. B. Lacey, Attorneys

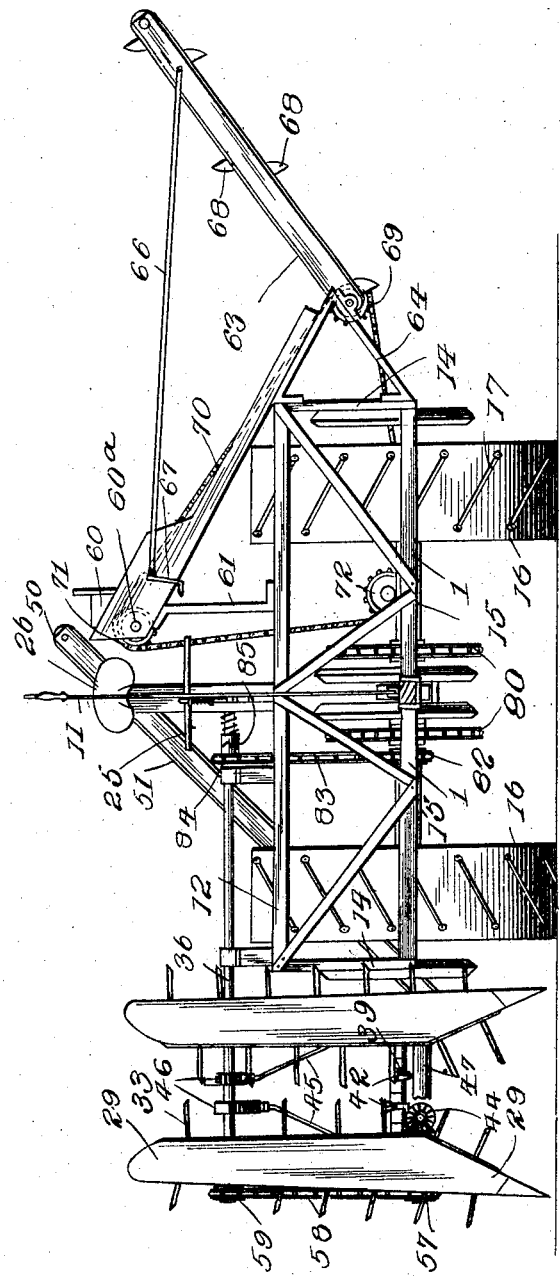

No. 845,958. PATENTED MAR. 5, 1907.
J. H. LEIDEL.
CORN PICKER.
APPLICATION FILED FEB. 17, 1906.
5 SHEETS—SHEET 3.
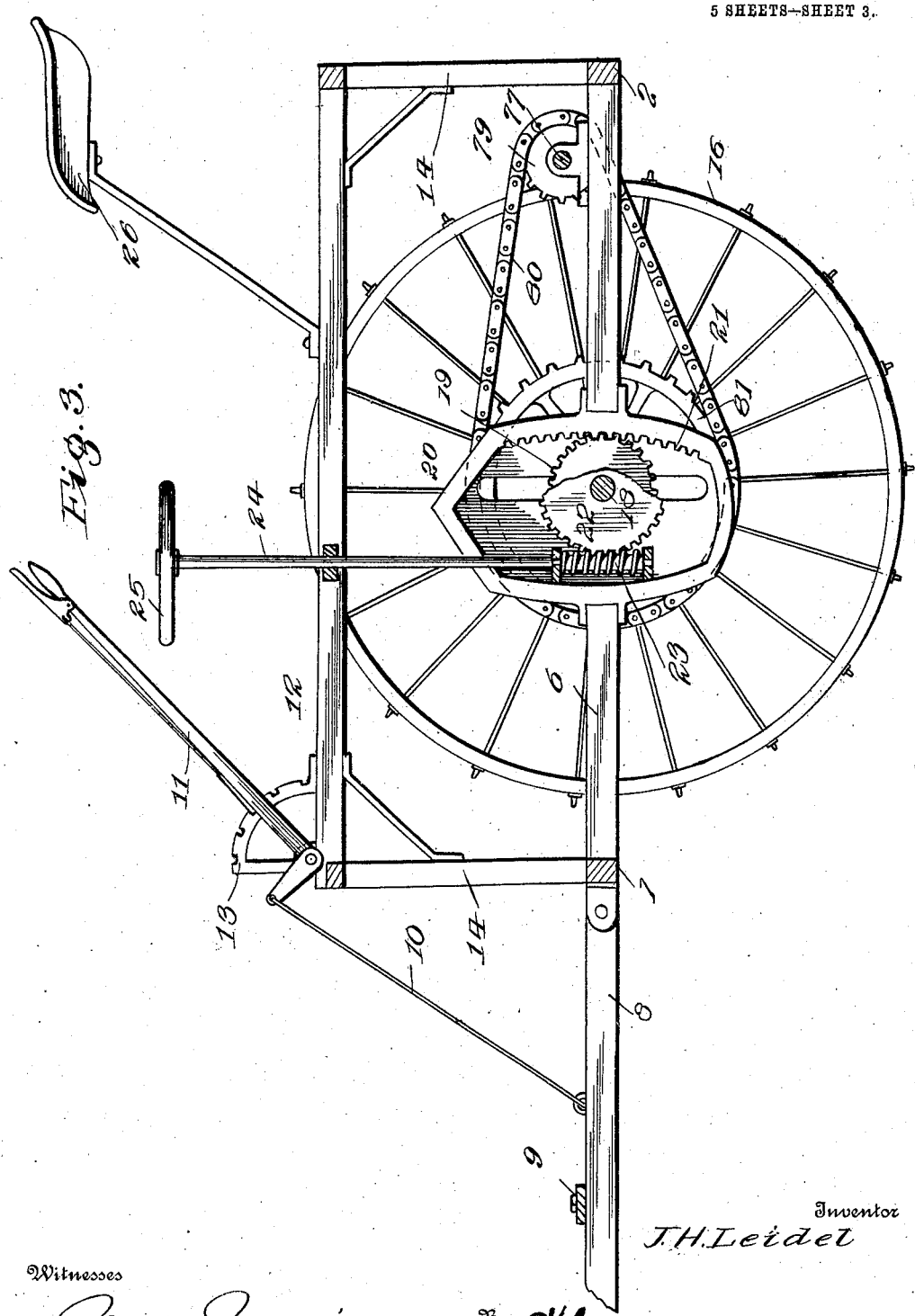
Witnesses
Inventor
J. H. Leidel
By Lacey, Attorneys

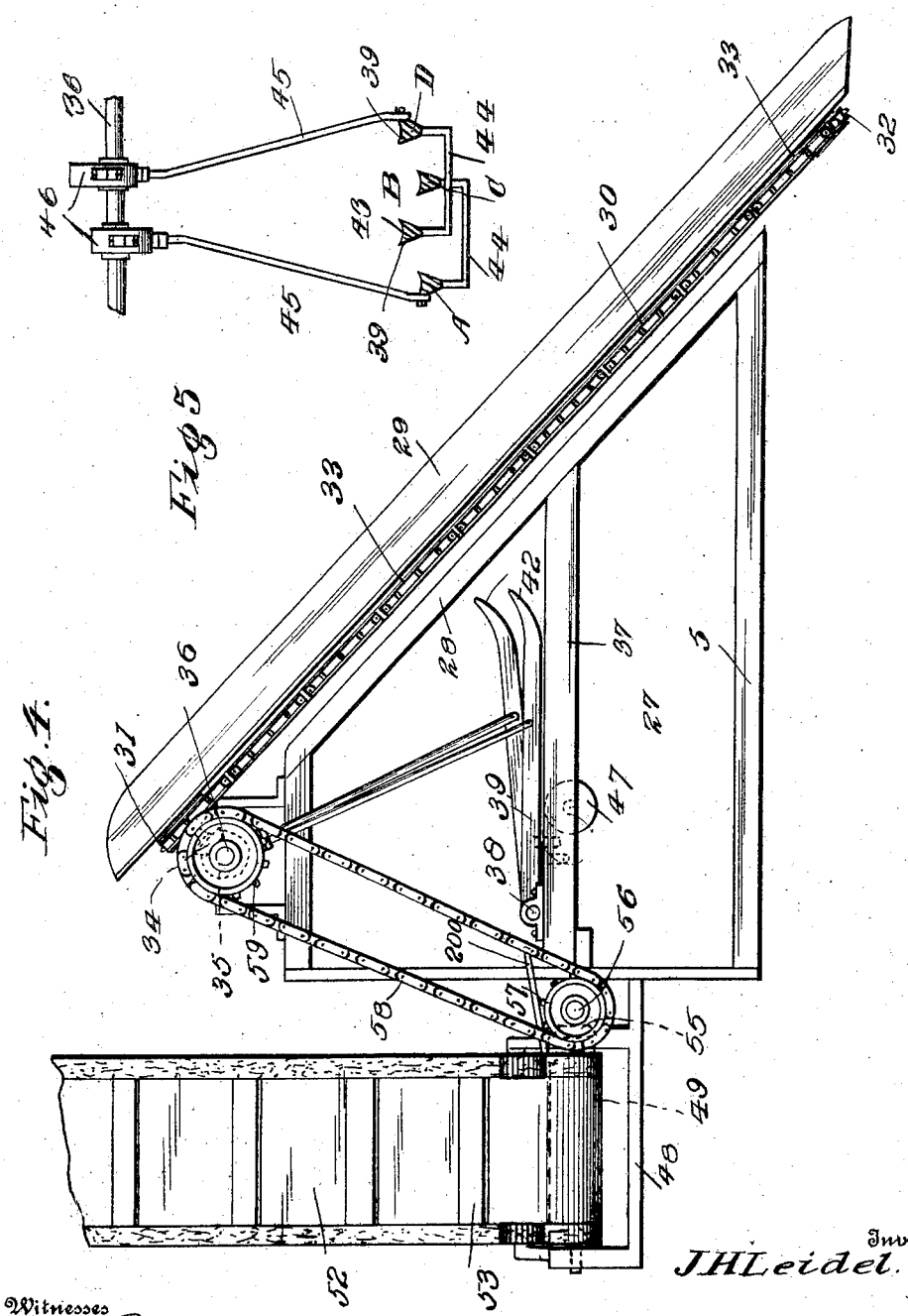

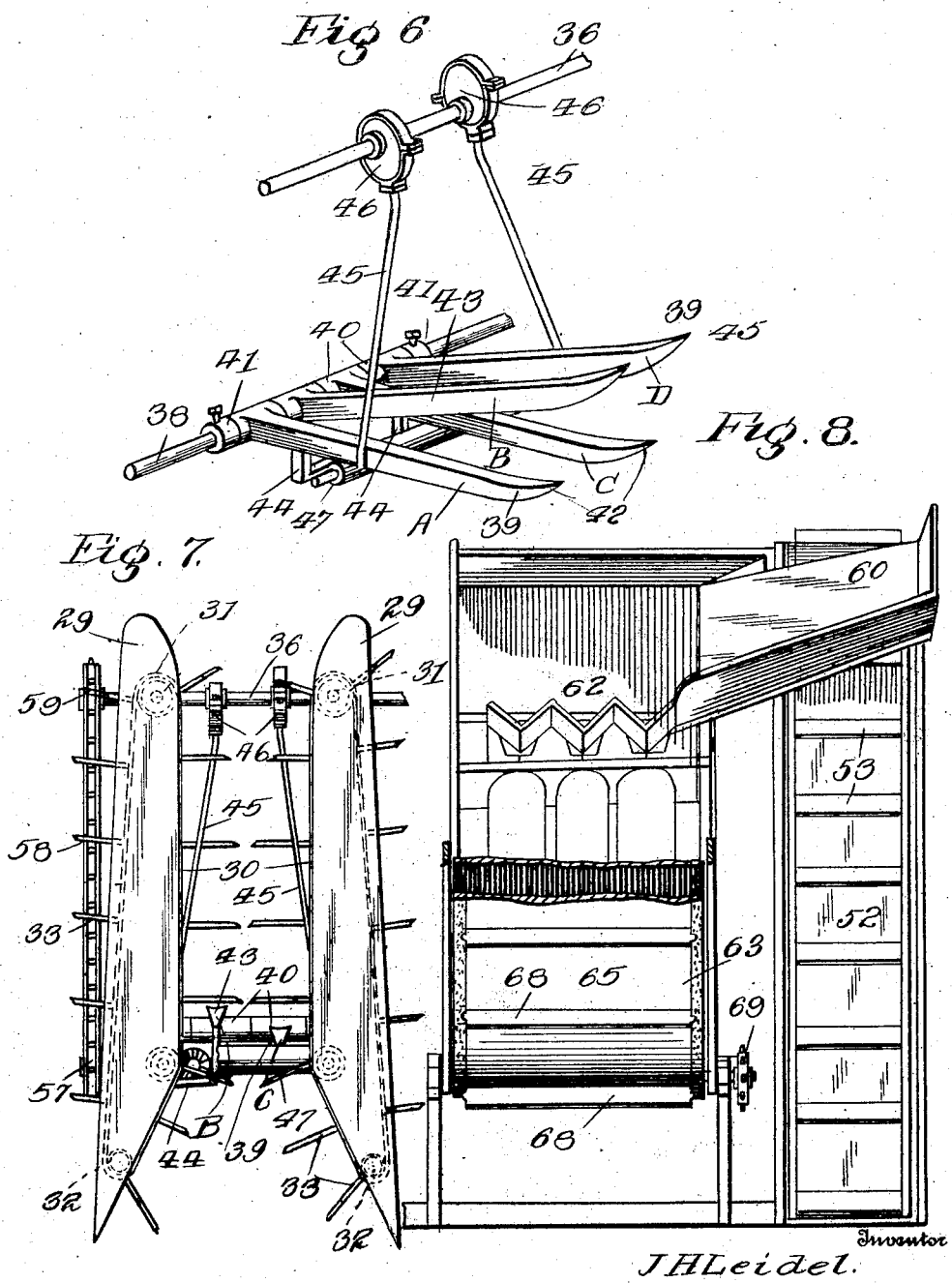

UNITED STATES PATENT OFFICE.

JOSEPH H. LEIDEL, OF DRESBACH, MINNESOTA.

CORN-PICKER.

No. 845,958.   Specification of Letters Patent.   Patented March 5, 1907.

Application filed February 17, 1906. Serial No. 301,705.

*To all whom it may concern:*

Be it known that I, JOSEPH H. LEIDEL, a citizen of the United States, residing at Dresbach, in the county of Winona and State of Minnesota, have invented certain new and useful Improvements in Corn-Pickers, of which the following is a specification.

My invention relates to that class of agricultural implements known as "corn pickers or harvesters," adapted to be driven between the rows of cornstalks and provided with means by which the ears of corn are stripped from the stalks and passed to the husking-machine proper.

The primary object of my invention is to provide an improved machine of the type above mentioned which will be so arranged that as the machine is drawn forwardly between the rows of stalks it will gather a certain number of stalks and snap the ears therefrom automatically and then pass the ears stripped from the stalks automatically to conveyers, which in turn will transport the ears to the husking-machine.

It is to be understood that the machine of my present invention is primarily intended to be used in connection with a corn-husker proper—that is, with a machine arranged to strip the husks from the corn.

A further object of my invention is to provide a machine of this character which will be practically automatic in its action and efficient in its operation to effectively snap all of the ears from the stalks without leaving any behind and at the same time without any danger of jamming the machine with the stalks.

The machine also embodies improved means for lowering and raising the operative parts into and out of position for their proper action and also embodies new and useful features of construction and arrangements and combinations of the parts, which will be hereinafter fully described, and specifically pointed out in the appended claims.

For a full description of the invention and the merits thereof and also to acquire a knowledge of the details of construction of the means for effecting the result reference is to be had to the following description and accompanying drawings, in which—

Figure 1 is a top plan view with parts in section of my improved corn-harvester. Fig. 2 is a front elevation thereof. Fig. 3 is a transverse sectional view on an enlarged scale. Fig. 4 is a detail side elevation of the feeding, ear-snapping, and a portion of conveying mechanism. Fig. 5 is a detail view of the ear-snapping fingers, the same being shown in their operative relation to their actuating means. Fig. 6 is a detail perspective view of the ear-snapping mechanism. Fig. 7 is a detail front elevation of the stalk-feeding mechanism and ear-snapping mechanism. Fig. 8 is a plan view illustrating the substantial relation between the husking mechanism proper and the conveyer of the present machine.

Corresponding and like parts are referred to in the following description and indicated in all the views of the drawings by the same reference characters.

To make plain the various parts and the combined action of such parts, I shall first describe the supporting-framework of the machine that carries the operative parts and also the means for raising and lowering such parts. I shall then describe the picking mechanism, next the conveying mechanism that is designed to receive the ears that have been stripped from the stalks and to transport them to one side or the other of the machine proper, and finally describe the complete general operation of the machine or so much thereof as has not been rendered unnecessary by having already described the detailed operation of the parts in connection with the construction thereof.

*Framework.*—The supporting-frame of my improved corn-picking machine comprises front and rear transverse bars 1 and 2, two main end bars 3 and 4, connected to the transverse bars 1 and 2, a supplemental end bar 5, which is connected at one end to the bar 2, and parallel intermediate bars 6 and 7, arranged at about the middle of the framework and spaced slightly from each other and connected at their ends, as shown, respectively to the bars 1 and 2. The end bars and intermediate bars all extend longitudinally, as shown. To the said framework there is secured in a pivotal manner a driving pole or thill 8, which may be provided with the usual whiffletree 9. The pole 8 in the present instance is connected by a link 10 to one arm of a hand-lever 11. The lever 11 is fulcrumed on the front end of an upper framework 12, supported on the first-named framework, and is arranged to engage a quadrant 13. The driver may by manipulation of the lever 11 adjust the pole or thill 8 to the desired elevation. The upper framework 12 is supported upon the lower framework by vertical posts 14 and is suitably braced, as shown.

The machine is provided with two tubular axles 15, to which the traveling wheels 16 are secured. These wheels are preferably provided on their peripheries with tractor pins or cogs 17 for the customary purpose. The two axles 15 are independent of each other, and in each one of said axles there is mounted a shaft 18. Each shaft 18 is provided at each end with a spur-pinion 19, and the four spur-pinions 19 are respectively received within rack-frames 20, two of which are secured to the longitudinal bars 3 and 4, respectively, of the framework, while the other two are secured to the intermediate longitudinal bars 6 and 7. Each of the rack-frames 20 is provided with a vertically-extending series of teeth or cogs 21, with which the several pinions 19 mesh. The shafts 18 are connected together at their adjoining ends and carry between the two middle pinions 19 a worm-gear 22, which meshes with a worm 23, mounted in suitable bearings and secured to the lower end of an actuating-rod 24, provided at its upper end with a hand-wheel 25. By this means it is manifest that the driver on the seat 26 may by turning the wheel 25 and through the instrumentality of the worm 23, worm-gear 22, pinions 19, and rack 21 raise or lower the framework with respect to the hollow axles 15 and traveling wheels 16, so that the framework and the parts which it carries may be supported at different elevations by the traveling wheels, so as to maintain the operative parts at the desired height either for action or inaction.

*The picking mechanism.*—At one side of the machine there is located a supplemental framework 27, (best seen in Fig. 4,) of which the supplemental end bar 5 forms a part. This frame 27 includes diagonal bars 28, on which diagonal guide-strips 29 are supported. The guide-strips 29 are spaced from each other in a transverse direction and are preferably diverged at their forward ends and constitute a guideway into which a certain number of stalks are received and passed rearwardly to the snapping-fingers as the machine is drawn forwardly. To positively engage the cornstalks and pass them for action by the snapping-fingers, I have provided two feeding devices, each of which comprises an endless chain 30, passing at its upper end around the sprocket 31 and at its lower end around two flanged idlers 32 and extending approximately in line with and throughout the length of the guide-strips 29. Each of these feeding devices also embodies a plurality of feeding-fingers 33, secured at desired intervals to the respective chains 30. The two sets of feeding-fingers move in the same direction rearwardly along the guideway constituted by the two spaced-apart guide-strips 29, as indicated by the dart in Fig. 1, and positively engage the cornstalks and pass them rearwardly, so that they may be properly acted upon by the snapping-fingers. Both of the feeding devices are simultaneously operated by means of bevel-pinions 34, meshing with corresponding pinions 35 on the transverse shaft 36.

The framework 27 is provided with side bars 37, which support upon their rear ends a transverse idle shaft 38. On this shaft there is mounted a plurality of vertical vibrating snapping-fingers 39, in the present instance four of such fingers being employed. Preferably the fingers 39 are provided with eyes 40 at their rear ends by which they are pivotally mounted side by side on the shaft 38, being preferably held in their proper position by means of butt-collars 41. The fingers 39 project forwardly from the shaft 38 substantially in a horizontal plane, and, as best seen in Fig. 6, each of said fingers is tapered at its front free end to a substantially dull point and is curved slightly upwardly, as indicated at 42. Furthermore, each finger is preferably concave on its upper side, as indicated at 43, and is substantially V-shaped in cross-section, the two sides tapering downwardly from the concave upper surface 43. The fingers 39 are for the purpose of distinction designated A, B, C, and D. Fingers A and C are connected together as a pair by means of a transverse yoke member 44, extending underneath them, and fingers B and D are similarly connected, so that the four fingers are arranged in two pairs, of which the alternating fingers form the members of the same pair. To each of the outermost fingers A and D a transversely-inclined pitman 45 is connected at its lower end, and the upper ends of the two pitmans are connected by eccentric-straps to eccentrics 46, mounted upon the shaft 36, before mentioned, and are arranged for alternate action thereon—that is to say, one of the eccentrics is down when the other is up, and vice versa, as the shaft 36 is rotated.

As the shaft 36 is rotated by means hereinafter set forth the two pairs of fingers A and C and B and D will rise and fall alternately and snap the ears of corn from the stalks that are fed to them by the forward movement of the machine and the guideway before described, and a roller 47 is journaled between the bars 37 and underneath the snapping-fingers, so as to preferably cause the stalks to pass downwardly in proper position for action thereon by the snapping-fingers. As the machine continues forwardly the stripped stalks will pass underneath the roller 47 to the rear of the machine, while the ears that have been stripped off will be passed rearwardly by the vibrating motion of the snapping-fingers onto slightly inclined boards 200, down which the ears will roll or slide onto the conveying mechanism. The arrangement of the assembled snapping-fingers and their specific individual construction insures their proper action without any jamming or crowding of the stalks between them, which would be liable to cause injury to the working parts of the machine.

*Conveying mechanism.*—At the rear and to one side of the machine a frame 48 is located and is preferably supported by the other framework of the machine, as best indicated in Fig. 1. One end of said frame 48 is located just in the rear of the ear-snapping or stalk-stripping mechanism. In that end of the frame 48 there is journaled a roller 49, designed to coact with the corresponding roller 50 at the upper end of an upwardly-inclined portion 51 of the frame 48. A feeding belt or apron 52 extends around said two rollers and is provided with a series of buckets or the like 53. It is to be understood that the conveyer-frame 48 is provided with a horizontal portion at the rear of the snapping-fingers and also with an upwardly-inclined portion leading from the horizontal portion, and to maintain the proper travel of the belt in the changed direction thus necessitated I provide rollers or sheaves 54, as best seen in Fig. 1. To the shaft of the roller 49 a beveled pinion 55 is secured, and said pinion meshes with a similar pinion on a shaft 56, mounted in the frame 48. The shaft 56 is provided with a sprocket-wheel 57, which is connected by sprocket-chain 58 to another sprocket 59 on the outer end of the shaft 36. By this means the conveyer just described is driven from the shaft 36. Subjacent the upper or discharge end of the said conveyer a chute 60 is mounted and is designed to receive the ears of corn from the discharge end of the said conveyer and to pass said ears onto the feed-board 62 of the husking mechanism proper, the operative parts of which I have deemed it unnecessary to describe in this case, as they form the basis of another invention. This husking mechanism is supported at one end by means of an upright 61 and at its other and lower end by triangular braces 64. The drive-shaft of the husking mechanism proper is designated 60ª. At the lower end of the husking mechanism there is mounted a conveyer 63, onto which the husking mechanism discharges. The conveyer 63 is mounted to tilt and is provided with links 66, connected to hand-actuated levers 67, preferably fulcrumed on the side boards of the husking mechanism, so as to hold the conveyer 63 at different angular positions. The conveyer 63 is provided with buckets 68 or the like and is driven by means of a sprocket-wheel 69. Around this sprocket-wheel extends a sprocket-chain 70, which also extends around the sprocket 71 on the drive-shaft 60ª of the husking mechanism and also around the sprocket 72, secured on the shaft 73. The shaft 73 is a stub-shaft mounted in a comparatively small frame 74, as best seen in Fig. 1, and said shaft is provided with a bevel-pinion 75, meshing with a similar pinion 76 on a counter-shaft 77. The counter-shaft 77 is provided with two one-way clutches 78, that are spring-pressed into action, as shown, and to one member of which are secured, respectively, sprocket-wheels 79, revoluble on the shaft. The sprocket-wheels 79 are operatively connected, by means of chains 80, to drive-sprockets 81, secured on the tubular axles 15. Hence as the machine is driven forwardly motion will be imparted to the shaft 73 and by the latter to the conveyer 63. A sprocket-wheel 82 is also revolubly mounted on the shaft 77, and is arranged to turn with the adjacent sprocket-wheel 79. The sprocket-wheel 82 is connected by a chain 83 to a sprocket-wheel 84, revolubly mounted on the shaft 36 and designed to be engaged with said shaft by means of a one-way clutch 85, similar to the clutches above mentioned. By this means it will be seen that the shaft 36 receives its motion from the counter-shaft 77 and also indirectly from the tubular axles 15.

From the foregoing description, in connection with the accompanying drawings, it is evident that when the machine travels forwardly over the corn-field the revoluble action of the traveling wheels will drive the husking mechanism by the means just before described, and likewise the shaft 36 will be driven and in turn actuate the snapping-fingers and will drive the feeding device and the conveyer which transports the ears of corn from the snapping devices to the husking mechanism. It will be seen that the machine is practically automatic in its action to feed the stalks to the ear-snapping or stalk-stripping devices, to pass the ears onto the transversely and upwardly moving belt, and to finally discharge the ears from the conveyer to the husking mechanism. The operative parts of the machine that are carried by the supporting-frameworks may all be readily raised or lowered out of or into position for their proper action by the driver on the seat 26 by the mere manipulation of the hand-wheel 25.

Having thus described the invention, what is claimed as new is—

1. In a machine of the character described, the combination of a plurality of ear-snapping fingers arranged side by side and each mounted to vibrate in a vertical plane, yokes connecting every other finger in pairs, and means for imparting a vibratory movement to each pair of fingers.

2. In a machine of the character described, the combination of a plurality of ear-snapping fingers arranged side by side and each mounted to vibrate in a vertical plane, yokes connecting every other finger in pairs, the yokes extending underneath the fingers, an actuating-shaft, means for operating the same, said shaft being provided with eccentrics and a pitman connected to each eccentric, each pitman being also operatively connected to one finger of each pair.

3. In a machine of the character described, the combination of a series of ear-snapping fingers arranged side by side and each mounted to vibrate in a vertical plane, transverse yoke members extending underneath said fingers each member being connected at its ends to the alternate fingers in the series, an actuating-shaft, means for operating the same, said shaft being provided with eccentrics, and pivotally-inclined pitmans operatively connected to the said eccentrics, each pitman being connected to the outermost finger of the series.

4. In a machine of the character described, the combination of a series of vibrating ear-snapping fingers mounted to vibrate in vertical planes and pivoted at their inner ends a rigid connection between each finger and the second finger from it in the series, said rigid connection being located in advance of the pivotal points of the said fingers, and means for imparting a vibratory movement to said fingers.

5. In a machine of the character described, the combination of a guideway for the stalks, an idle shaft secured at the rear of the guideway and extending transversely thereof, a series of ear-snapping fingers provided at one end with apertured ears by which they are mounted on said shaft to freely vibrate in vertical planes, said fingers being arranged in pairs connected together, alternate fingers constituting the two members of the same pair, yoke members 44 constituting the means for connecting said fingers together in pairs, an actuating-shaft 36 means for rotating said shaft, said shaft being provided with two eccentrics arranged to operate alternately, and downwardly-diverging pitmans operatively connected to said eccentrics, each pitman being connected at one end to the outermost finger of a pair of fingers.

6. A corn-harvesting machine comprising a framework, ground or traveling wheels mounted in said framework and provided with tubular axles, a shaft inclosed by said axles and operatively connected to said frame, two sprocket-wheels secured respectively to the two tubular axles, a counter-shaft 77 operatively connected to said sprocket-wheels, a shaft 36 having a driven connection with the shaft 77 and provided with eccentrics and a sprocket-wheel 59, a stalk-receiving guideway, endless guiding devices mounted to move therein, means whereby said devices will be driven from the shaft 36, ear-snapping fingers having a pitman connection with the eccentrics of the shaft 36, a conveyer with means to receive the ears from the ear-snapping fingers and arranged to be driven from the sprocket-wheel 59 of the shaft 36, husking mechanism, conveying mechanism arranged to receive the husked corn from the husking mechanism, and an operative connection between said husking mechanism and last-named conveyer and the shaft 77.

7. A corn-harvesting machine, comprising a framework, ground or traveling wheels mounted therein and provided with independently-rotatable axles, a sprocket-wheel secured to each of said axles, a counter-shaft 77 in the rear of said axles and provided with two sprocket-wheels operatively connected to the sprocket-wheels of the axles respectively, one-way clutches for connecting the sprocket-wheels of the shafts 77 with the sprocket-wheels of the axles when moving in one direction, husking mechanism embodying a drive-shaft, a conveyer arranged to receive the husked corn from the husking mechanism and also embodying a drive-shaft both the said drive-shafts being provided with sprocket-wheels, a shaft 73 operatively connected to the shaft 77 at one end of the latter and provided with a sprocket-wheel 72, a chain extending around the sprocket-wheel 72 and around the sprocket-wheels of the drive-shafts of the husking mechanism and the said conveyer, a sprocket-wheel 82 on the opposite end of the shaft 77, a counter-shaft 36 provided at one end with a sprocket-wheel and a one-way clutch, the sprocket-wheel being operatively connected to the sprocket-wheel 82, said shaft 36 being provided with eccentrics and at its outer end with another sprocket-wheel, stalk-feeding mechanism, means for actuating the same, a conveyer at the rear end of the machine in the rear of the feeding devices an operative connection between said conveyer and the sprocket-wheel at the outer end of the shaft 36, the conveyer being arranged to feed the ears to the husking mechanism, and vertically-vibrating snapping-fingers having an operative connection with the eccentrics of the shafts 36 as and for the purpose set forth.

In testimony whereof I affix my signature in presence of two witnesses.

JOSEPH H. LEIDEL. [L. S.]

Witnesses:
WILMOT MOWATT,
H. J. TUCKER.